(12) United States Patent
Hampton

(10) Patent No.: US 9,044,070 B2
(45) Date of Patent: Jun. 2, 2015

(54) ZIPPER REPAIRER AND EXTENDER

(76) Inventor: Tammy Rice Hampton, Buford, GA (US)

( * ) Notice: Subject to any disclaimer, the term of this patent is extended or adjusted under 35 U.S.C. 154(b) by 92 days.

(21) Appl. No.: 13/418,103

(22) Filed: Mar. 12, 2012

(65) Prior Publication Data

US 2013/0061434 A1 Mar. 14, 2013

Related U.S. Application Data

(60) Provisional application No. 61/466,419, filed on Mar. 22, 2011.

(51) Int. Cl.
*A44B 19/00* (2006.01)
*A44B 19/02* (2006.01)
*B23P 6/00* (2006.01)
*A44B 19/20* (2006.01)

(52) U.S. Cl.
CPC . *A44B 19/02* (2013.01); *B23P 6/00* (2013.01); *Y10T 24/2561* (2015.01); *Y10T 29/49732* (2015.01); *A44B 19/20* (2013.01)

(58) Field of Classification Search
CPC .............................. A44B 19/00; Y10T 24/25
USPC ................... 24/382, 435, 440, 437, 439, 381
See application file for complete search history.

(56) References Cited

U.S. PATENT DOCUMENTS

| | | | | | |
|---|---|---|---|---|---|
| 2,971,200 | A | * | 2/1961 | Boyd | 2/265 |
| 2007/0169319 | A1 | * | 7/2007 | Chu | 24/382 |

\* cited by examiner

*Primary Examiner* — Jack W Lavinder
(74) *Attorney, Agent, or Firm* — Usha S Koshy

(57) ABSTRACT

A zipper device for repairing and extending the life of a standard zipper used on boat tops, covers and enclosures, or the tops, covers and enclosures on other equipment that use a zipper for fastening and snapping together their openings. The use of the zipper device of the present invention also widens a standard zipper to provide slack to tops, covers and enclosures on boats and other equipment.

12 Claims, 2 Drawing Sheets

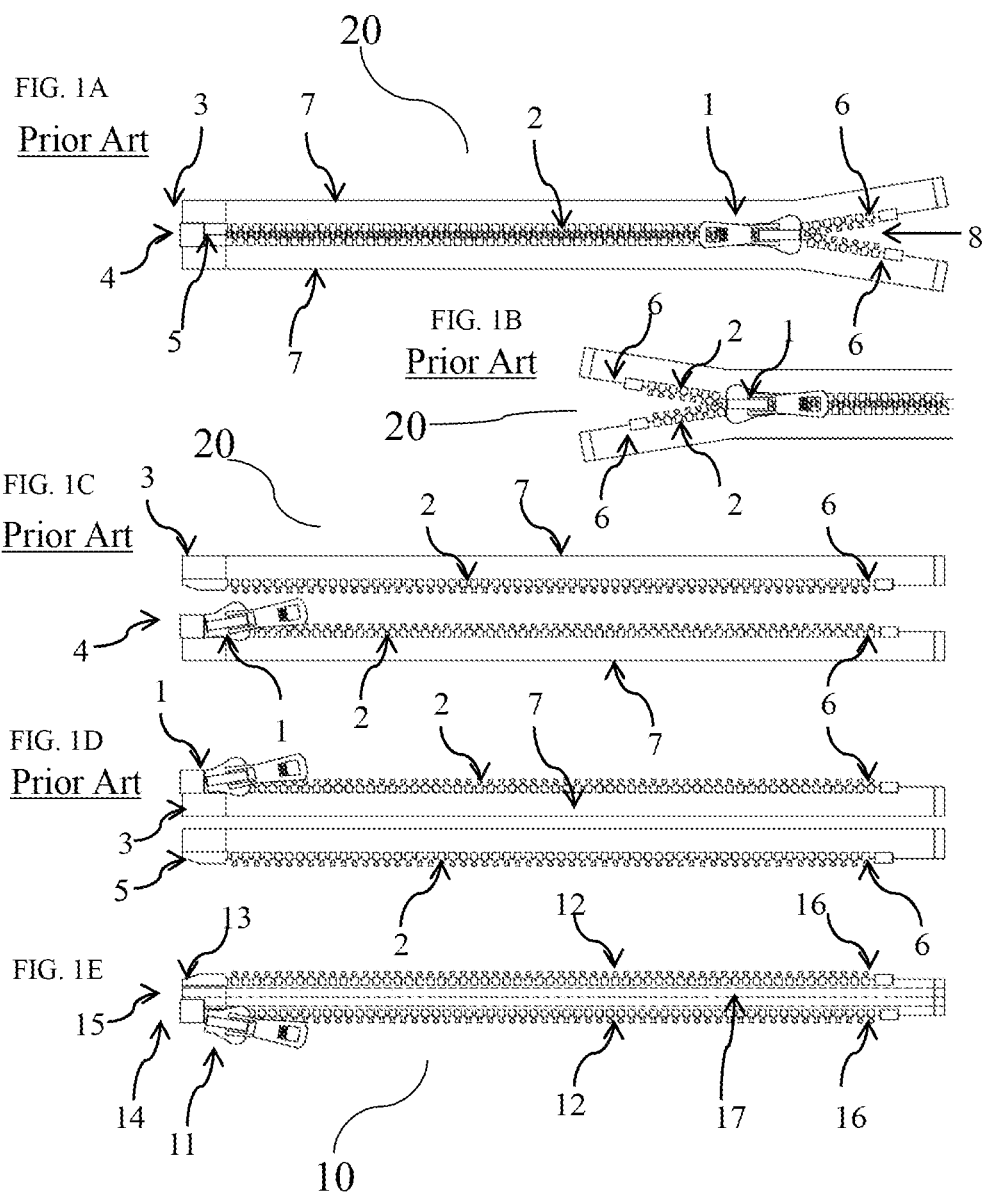

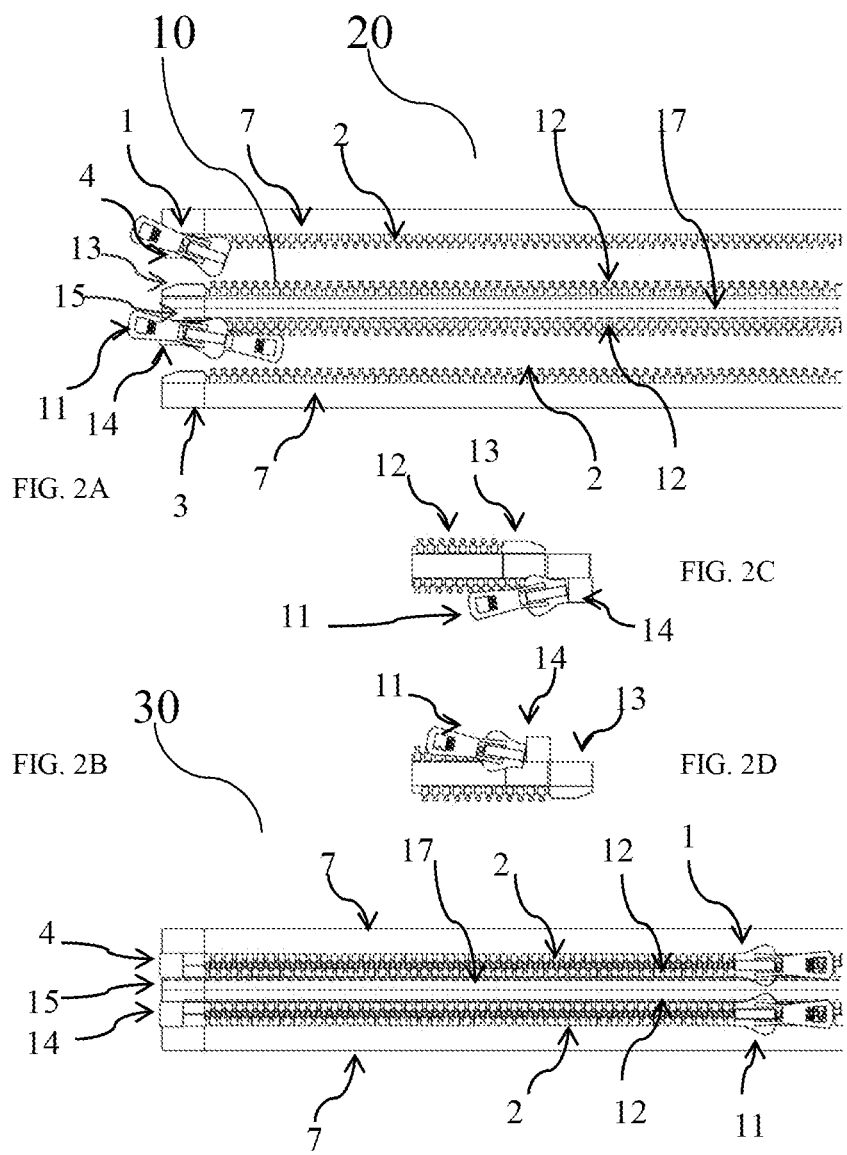

US 9,044,070 B2

ZIPPER REPAIRER AND EXTENDER

CROSS REFERENCE TO RELATED APPLICATION

This Non-provisional Patent Application claims priority to U.S. Provisional Patent Application No. 61/466,419 Titled, "Zipper Extender" filed, Mar. 22, 2011.

FIELD OF THE INVENTION

This invention generally relates to zippers. More particularly, the invention relates to a zipper device for repairing and extending the life of a zipper while at the same time providing a means to add width to zippered sections of material which may have shrunk due to extended wear or exposure to the elements.

BACKGROUND OF THE INVENTION

The use of zippers to close and fasten the openings of jackets and jeans as well as to close and secure the openings of handbags, luggage, sleeping bags, campers, tents, boat tops etc., are well known in the art. A zipper is comprised of two rows of teeth, with each row of teeth attached to separate strips of fabric tapes which are in turn sewn to the open ends of a jacket, jeans, luggage, bag or other gear, and with the two rows of the zipper teeth brought together and interlocked by a slider which travels up and down the length of the teeth.

Zippers in general are made of plastic, nylon, or metal and tend to get damaged for a variety of reasons including prolonged use or exposure to the elements. Damage to a zipper is predominantly related to wear and tear of the teeth creating misalignment of the teeth which prevents the zipper slider from traveling smoothly up and down the two rows of teeth to open or close the garment or other equipment, resulting in an inoperable zipper. Once the zipper of a garment, luggage, hand bag or other equipment is damaged, these items are rendered unusable unless the damaged zippers are replaced. Generally, the garment, luggage, bags or other equipment with damaged zippers are discarded rather than have their zippers repaired or replaced because doing so is a costly, tedious, and time consuming process.

Boat tops, covers and enclosures depend on properly functioning zippers to maintain air tight and water tight seals. Prolonged exposure of these zippers to the elements especially the sun's UV rays will over a period of time result in the zippers eventually becoming corroded and brittle with breakage of some of the teeth or the zipper slider itself falling off the zippers. The other principle reason for an inoperable zipper is when the sets of teeth get pulled apart and pop open due to shrinkage of the zipper tapes or shrinkage of the materials used for the panels attached to the tapes. This is especially the case with clear vinyl panels used for some boat covers which tend to shrink over time due to sun exposure resulting in a strain on the zippers and the pulling apart of their teeth. The resulting significant gap between the panels makes it difficult if not impossible to keep the panels snapped together on a boat top, cover, or other enclosure.

There is a need in the prior art for a device or mechanism by which damaged zippers can be repaired while they are still attached to the boat tops, covers and enclosures, or the tops, covers and enclosures on other equipment without the need to replace the worn out zippers along with the tops, covers, or enclosures which can be an expensive and cumbersome undertaking. There is also a need in the prior art for a device that can act as a spacer to an operable zipper in order to relieve the pressure on the zipper to pop open due to zipper tape material shrinkage or shrinkage of the material on the panels attached to the zipper tape. Such a device would also add back the width to the top, cover, or enclosure that may have been lost due to shrinkage of the zipper tape or panel material shrinkage. The present invention provides such a device to overcome the deficiencies in the prior art for a device and mechanism to repair damaged zippers and extend the life of operable zippers while adding width to the zippers and to the panels attached to the zippers, thereby providing the needed slack to maintain the integrity of the tops, covers, or enclosures on boats, or the tops, covers, or enclosures on other equipment exposed to the sun, water, or other elements.

SUMMARY OF THE INVENTION

The present invention is a zipper device to be used with a standard marine or other zipper to repair and extend the life of that zipper. Embodiments of the zipper device can also be used as a spacer zipper to provide width and slack to tops, covers and enclosures on boats, or other equipment.

In the exemplary embodiment of the present invention, the zipper device is comprised of a length of zipper tape with a set of teeth elements welded to each side of the length of the tape facing away from each other and a slider positioned at one end of one set of teeth elements. In this embodiment of the invention, the zipper device is inserted between the two rows of teeth elements of a marine or other standard zipper with the teeth elements on either side of the zipper device aligned with the corresponding row of teeth elements on the separated standard zipper and with the slider of the zipper device and the standard zipper slider positioned on opposing sides in order to facilitate the zipping up of each side of the zipper device to the original zipper. In this embodiment of the invention, the zipper device acts as a zipper extender and spacer to relieve the pressure on an existing functional zipper and prevent the teeth elements of the zipper from popping open due to shrinkage of the zipper fabric tape and/or shrinkage of the material of the panels attached to the zipper tape.

In a related embodiment of the present invention, when the zipper device is inserted between the teeth elements of a standard zipper, it provides sufficient width and slack to the tops, covers and enclosures, of a boat or other equipment that use a zipper to fasten and secure their openings. In this embodiment, the zipper device of the present invention, adds at least ⅞ inches width to the original zipper so that the shrunken panels on a boat top, cover or enclosure have sufficient reach to be able to snap together and be secured.

In yet another exemplary embodiment of the present invention, the zipper device of the invention acts as a zipper repairer for aging marine or other zippers with broken teeth elements or teeth separation caused by zipper tape or panel shrinkage due to UV degradation. In this embodiment, the zipper device is inserted in between the separated teeth elements of the damaged zipper with the teeth elements on either side of the zipper device aligned with the corresponding row of teeth elements on the zipper with the slider of the zipper device and the zipper slider on opposing sides in order to facilitate the zipping up of each side of the zipper device to the original zipper. The insertion and zipping up of the zipper device between the separated teeth elements of the damaged zipper makes the zipper whole so that the panels on either side of the zipper are brought together and secured in place on a boat top, cover, enclosure or the tops, covers, or enclosures on other equipment.

In the summary of the invention thus provided, and in the specification in general, an embodiment is an example or implementation of the invention as conceptualized. The various references to "an embodiment," "in yet another embodiment," or "related embodiment" do not necessarily refer to the same embodiment(s). Rather, these references mean that a particular feature, structure, or other characteristic described in connection with an embodiment is included in at least some embodiments, but not necessarily all embodiments of the invention. Although various features of the invention may be described in the context of a single embodiment, the features may also be provided separately or in any suitable combination. Conversely, although the invention may be described herein in the context of separate embodiments for clarity, the invention may also be implemented in a single embodiment.

The features and advantages of the embodiments of the present invention as described in this summary of the invention will be further appreciated and become obvious to one skilled in the art when viewed in conjunction with the accompanying drawings, detailed description of the invention and the appended claims.

BRIEF DESCRIPTION OF THE DRAWINGS

FIG. 1 is an overall perspective view illustrating the differences between a standard zipper and the zipper device of the present invention.

FIGS. 1A and 1B show a standard zipper.

FIG. 1C shows a standard zipper with the two rows of teeth elements separated.

FIG. 1D shows an inverted image of a standard zipper with the two rows of teeth elements facing away from each other and the two strips of zipper tape facing each other.

FIG. 1E is a perspective view of an exemplary embodiment of the zipper device of the present invention showing the two rows of teeth welded to the single zipper tape.

FIG. 2 is a perspective view illustrating the manner in which the zipper device of the present invention is inserted between the teeth elements of a standard zipper and the teeth elements of the zipper device is aligned with the teeth elements of the separated zipper and zipped up to create a wider zipper.

FIG. 2A depicts the manner of insertion of the zipper device between the teeth elements of an open separated zipper.

FIG. 2B illustrates a standard separated zipper with the zipper device inserted between the teeth of the zipper to produce a wider zipper.

FIG. 2C shows the zipper device with an offset retaining box.

FIG. 2D shows the zipper device with an offset insert pin.

DETAILED DESCRIPTION OF THE INVENTION

The present invention is a zipper device that can be used to repair damaged zippers and also act as a spacer zipper to relieve the pressure on existing zippers before their teeth elements pop open and the zippers fail. The zipper device of the present invention is also useful in extending the width of zippers on boat tops, covers and enclosures or the tops, covers or enclosures on other equipment.

Referring now to the figures, more particularly to FIG. 1 a perspective view illustrating the differences between a standard zipper 20 and the zipper device 10 is shown. FIG. 1A illustrates the main parts of a standard zipper 20 with the zipper slider 1, a set of teeth elements 2 and the zipper tapes 7 to which the teeth elements 2 are attached. Each zipper tape 7 with its attached row of teeth elements is in turn firmly attached to separate panels of material. A Y-shaped channel 8 is formed as the zipper slider 1 moves along the teeth elements 2 to open and separate the two side panels on a top, cover, or enclosure. A retaining box 4, a set of box pins 5, an insert pin 3 and zipper stops 6 complete the zipper structure. FIG. 1B shows one end of a standard zipper with the zipper slider 1, teeth elements 2 and zipper stops 6.

FIG. 1C shows a standard separated zipper with the zipper slider 1 positioned at one end of a zipper tape. In this perspective view, the two rows of teeth elements 2 are separated, but facing each other. FIG. 1D is an illustration of how a zipper 20 looks when the zipper tapes 7 are inverted facing each other with the teeth elements 2 facing away from each other as in the exemplary embodiment of the zipper device of the present invention which is shown in more detail in FIG. 1E.

FIG. 1E is a perspective view of the exemplary embodiment of the zipper device 10 of the present invention. The zipper slider 11 of the zipper device 10 is positioned at one end of one side of the zipper device 10 with a retaining box 14 connected to the zipper slider 11 as in a standard zipper. However, unlike in a standard zipper, the teeth elements 12 of the zipper device 10 run longitudinally along the outside edges of the zipper device 10 facing away from each other with a single zipper tape 17 lying between the two rows of teeth elements 12 and holding the teeth elements 12 in place. In the exemplary embodiment of the zipper device of the present invention, the teeth elements 12 are welded to the single zipper tape 17 of the device. The zipper tape 17 of the zipper device 10 may typically be ¾ inches wide, but may be constructed of any width to accommodate the needs of a specific garment, bag, luggage, boat cover, enclosure, tent or other items or equipment. The zipper device 10 of the invention has a box pin 15 on the side next to the zipper slider 11 and an insert pin 13 positioned across from the retaining box 14 and the box pin 15. Two zipper stops 16 of the zipper device 10 are positioned at the bottom ends of the zipper device 10 and may preferably and advantageously be replaced by stainless steel crimps (not shown).

FIG. 2 illustrates the use of the zipper device 10 of the present invention with a standard zipper 20. In FIG. 2A the zipper device 10 is placed between the two rows of teeth elements 2 of a standard separated zipper 20 with the zipper device 10 teeth elements 12 lining up with the standard zipper 20 teeth elements 2. The zipper device 10 insert pin 13 is then inserted into the retaining box 4 of the standard zipper 20 so that the zipper slider 1 of the standard zipper 20 is able to couple one length of teeth elements 2 on the standard zipper 20 with one length of teeth elements 12 on the zipper device 10 that lie facing each other. On the opposite side of the zipper device 10 the insert pin 3 on the standard zipper 20 is inserted into the retaining box 14 of the zipper device 10 so that the zipper device 10 slider 11 is able to couple the second set of teeth elements 12 on the zipper device 10 with the second set of teeth elements 2 on the standard zipper 20.

FIG. 2B shows the complete structure resulting from the coupling of the zipper device 10 of the present invention with the standard zipper 20 to create a wider zipper 30. The teeth elements 2 of the standard separated zipper are coupled to the teeth elements 12 of the zipper device with the zipper device tape 17 lying in between the two sets of teeth elements. The standard zipper slider 1 and the zipper device slider 11 can be seen lying parallel to each other on the finished wide zipper 30. The other parts visible are the standard zipper retaining box 4, the zipper device retaining box 14 and the box pin 15.

FIG. 2C shows the zipper device 10 retaining box 14 offset so that it may extend past the insert pin 13. In FIG. 2D the insert pin 13 is shown offset so that it can extend past the retaining box 14. Typically the offset distance may be about ⅞ inches or another suitable offset distance. In these embodiments of the zipper device of the present invention, the offset positions of the retaining box and insert pin are used to correct two halves of a standard zipper that are out of alignment with each other.

It is to be understood that the details of the present invention as set forth herein do not limit any application or scope of the invention and the phraseology and terminology used to describe the invention are for descriptive purposes only. It is to be further understood that the invention can be carried out or practiced in various ways and implemented in embodiments other than the ones outlined in the description above. It should be understood and obvious to one skilled in the art that alternatives, modifications, and variations of the embodiments of the invention may be construed as being within the spirit and scope of the appended claims.

What is claimed is:

1. A zipper repairer device comprising:
   a single length of zipper tape;
   a plurality of teeth elements welded to each side of said single length of zipper tape facing away from each other;
   a zipper slider at one end of one side of said zipper repairer device;
   a set of zipper stops at a bottom ends of said zipper repairer device;
   a retaining box attached to said zipper tape;
   an insert pin spaced from said retaining box;
   a box pin next to said retaining box;
   wherein said insert pin is offset to extend past said retaining box; or
   said retaining box is offset to extend past said insert pin; and
   wherein the offset positions of the retaining box and the insert pin are used to correct two halves of a standard zipper that are out of alignment with each other.

2. The zipper repairer device of claim 1 wherein said zipper slider at one end of one side of said zipper repairer device interlocks said plurality of teeth elements welded to one side of said single length of zipper tape with one set of a plurality of teeth elements of a standard zipper through an insert pin of said standard zipper.

3. The zipper repairer device of claim 1 wherein said plurality of teeth elements welded to the other side of said single length of zipper tape interlocks with a second set of a plurality of teeth elements of a standard zipper through a zipper slider of said standard zipper and the said box pin of the zipper repairer device.

4. The zipper repairer device of claim 1 wherein the said zipper repairer device is inserted between a plurality of separated teeth elements of a standard zipper on a boat top, boat cover, or other enclosure, said teeth elements of said standard zipper having popped open due to pressure exerted by shrinkage of standard zipper tapes from exposure to sun, water, wind or other elements, or shrinkage of materials on panels attached to standard zipper tapes due to ultra violet (UV)-related degradation, or degradation from exposure to water, wind, or other elements, thereby repairing a separated standard zipper and thus extending the life of a standard zipper without having to replace said standard zipper.

5. The zipper repairer device of claim 1 wherein the said zipper repairer device can be used with a functioning standard zipper in order to provide width and slack to a boat top, boat cover, or other enclosure panels.

6. The zipper repairer device of claim 1 wherein the said set of zipper stops may preferably and advantageously be replaced by stainless steel crimps.

7. The zipper repairer device of claim 1 wherein the zipper repairer device may be constructed of plastic, nylon, metal, or other suitable material.

8. A zipper spacer device comprising:
   a single length of zipper tape;
   a plurality of teeth elements welded to each side of said single length of zipper tape facing away from each other;
   a zipper slider at one end of one side of said zipper spacer device;
   a set of zipper stops at a bottom ends of said zipper repairer device;
   a retaining box attached to said zipper tape;
   an insert pin spaced from said retaining box;
   a box pin next to said retaining box;
   wherein said insert pin is offset to extend past said retaining box; or
   said retaining box is offset to extend past said insert pin; and
   wherein the offset positions of the retaining box and the insert pin are used to correct two halves of a standard zipper that are out of alignment with each other.

9. The zipper spacer device of claim 8 wherein said zipper slider at one end of one side of said zipper spacer device interlocks the first set of teeth elements welded to one side of said single length of zipper tape with one set of teeth elements of a standard zipper through an insert pin of the standard zipper.

10. The zipper spacer device of claim 8 wherein the teeth elements welded to the other side of said single length of zipper tape interlocks with the second set of teeth elements of a standard zipper through a zipper slider of the standard zipper and said box pin of the zipper spacer device.

11. The zipper spacer device of claim 8 wherein placement of the zipper spacer device between a plurality of teeth elements of a standard zipper extends width of a standard zipper by at least ⅞ of an inch to provide slack to boat tops, boat covers and boat enclosures as well as width and slack to tops of other equipment covers and enclosures that have a propensity to shrink when exposed to the elements.

12. A method of repairing and providing width to a standard zipper on a boat top, boat cover, or other enclosure, the method comprising:
   a) providing a zipper repairer and spacer device comprising:
      a plurality of teeth elements welded to each side of a single length of zipper tape facing away from each other;
      a zipper slider at one end of said single length of zipper tape;
      a set of zipper stops at a bottom ends of said zipper repairer device;
      a retaining box attached to said zipper tape;
      an insert pin spaced from said retaining box;
      a box pin next to said retaining box;
      wherein said insert pin is offset to extend past said retaining box; or
      said retaining box is offset to extend past said insert pin; and
      wherein the offset positions of the retaining box and the insert pin are used to correct two halves of a standard zipper that are out of alignment with each other;
   b) placing the said zipper repairer and spacer device between a plurality of teeth elements of a separated standard zipper on boat tops, boat covers, and other enclosures that have popped open due to shrinkage of zipper tape from exposure to sun, water, wind or other elements or shrinkage of materials on panels attached to standard zipper tapes due to ultra violet (UV)-related degradation, or degradation from exposure to water, wind, or other elements and closing the zipper sliders on said zipper repairer and spacer device and said standard zipper thereby securing panels on a boat top, boat cover, or other enclosures without having to replace said separated standard zipper; or c) placing the zipper repairer and spacer device between a plurality of teeth elements of a functioning standard zipper on boat tops, boat covers and other enclosures to extend width of said standard zipper by at least ⅞ of an inch such that shrunken panels on either side of a zipper on a boat top, boat cover, or other enclosure are provided sufficient reach to enable them to be brought together and secured.

* * * * *